June 1, 1954     T. R. ANGUS     2,679,667

SEALING STRIP

Filed March 26, 1949

INVENTOR.
THOMAS R. ANGUS
BY
Oberlin & Limbach
ATTORNEYS.

Patented June 1, 1954

2,679,667

UNITED STATES PATENT OFFICE 2,679,667

SEALING STRIP

Thomas R. Angus, Willoughby, Ohio, assignor, by mesne assignments, to The Eagle-Picher Company, Cincinnati, Ohio, a corporation of Ohio Application March 26, 1949, Serial No. 83,627

8 Claims. (Cl. 20—69)

This invention relates as indicated to a novel sealing strip and, more particularly, to a form of sealing strip especially adapted to the sealing of automobile engine-hoods and like closures.

Various types of resilient sealing strips, weather strips, bumper strips, and related articles are well known in the art, many being especially adapted for use about automobile door openings, rear trunk and engine-hood closures. Such articles will hereafter be inclusively referred to as "sealing strips" although it will be appreciated that the same may and generally will serve other related purposes.

Such sealing strips may be divided into two classes, those formed of resilient rubber or like resilient material and intended to be directly adhered or clamped to the frame or closure member and those including metal attaching members or devices in combination therewith. The present invention is concerned with such latter type.

As shown and described in U. S. Patent Application Serial No. 64,742 of Burton H. Cable, James W. Davidson, and Ralph E. Harrah, "Extrusion Die and Method of Extruding," filed December 11, 1948, now abandoned, it is possible to provide resilient sealing strip and the like having embedded therein a continuous metal strip for the purpose of attaching the resilient sealing strip where desired. Such metal strip may be molded in an elongated resilient rubber element or preferably the rubber portion of the assembly will be continuously extruded onto the metal supporting and attaching strip in the manner taught in the aforesaid application.

The resilient rubber strip may take a variety of cross-sectional shapes including resilient flanges or ribs, and may be tubular in cross-section. When the resilient strip is subjected to lateral pressure in use, the prior art metal reinforcing and attaching members have proven to be generally satisfactory in use but, when the strip is to be mounted for engagement in a direction directly opposed to an edge of the embedded metal member, various difficulties arise. In such position the metal member fails to afford any additional resilient or cushioning effect for the rubber strip and tends instead to subject the latter to excessive shearing stresses. This is particularly true if the rubber element is not bonded as by vulcanization or cementing to such metal member.

It is therefore a principal object of this invention to provide an improved sealing strip including both a resilient element of a material such as rubber and an embedded reinforcing and attaching member which will ordinarily be of metal, such reinforcing member being shaped and disposed to resiliently support the resilient rubber member in use.

Still another object of my invention is to provide a sealing strip of the type indicated in which the reinforcing member is designed to facilitate bending of the strip in any of several directions in order properly to mount the same.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figures 4, 5:
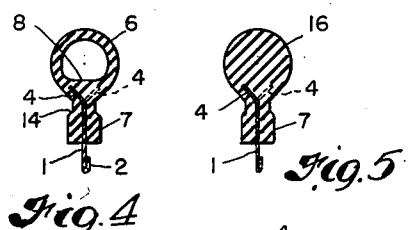
Fig. 4 is a vertical sectional view through such assembled strip taken along the line 4—4 on Fig. 3.
Fig. 5 is a view similar to Fig. 4 but showing another modification wherein the resilient cushioning and sealing member is of solid resiliently deformable material rather than tubular as shown in Fig. 4.
Figures 6, 7:
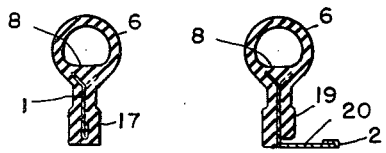
Fig. 6 illustrates another embodiment similar to the Fig. 4 construction but with the metal reinforcing element entirely enclosed within the resilient rubber portion.
Figure 8:
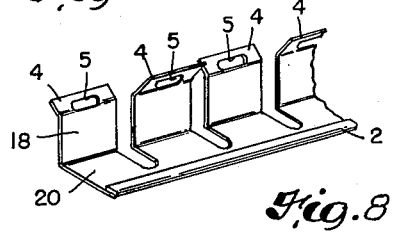
Figure 9:
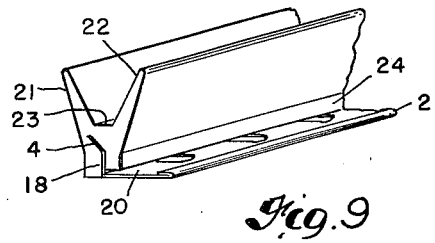
Figure 10:
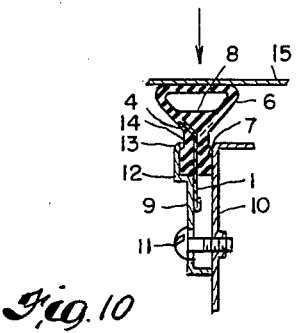

Fig. 7 likewise illustrates another modification wherein the protruding stem portion of the reinforcing member is bent at right angles;

Fig. 8 is a perspective view of a section of such metal reinforcing member illustrated in Figs. 7 and 9;

Fig. 9 is a perspective view of another form of sealing strip having two parallel resilient ribs and including a reinforcing element of the type shown in Fig. 8; and Fig. 10 is a sectional view showing a sealing strip of the type illustrated in Fig. 4 as deformed in use when mounted to seal an automobile engine-hood, for example.

Figure 1:
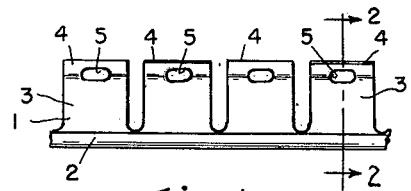
Fig. 1 is an elevational view of my new improved sealing strip reinforcing member.
Figure 2:
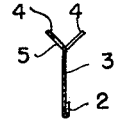
Fig. 2 is a vertical sectional view through such member taken along the line 2—2 on Fig. 1.

Referring now more particularly to said drawing and especially Figs. 1 and 2 thereof, the reinforcing element there illustrated comprises a sheet metal strip 1 having one edge rebent to form a narrow bead 2 adapted to impart a degree of relative rigidity to this portion of the member. The remainder of the strip is deeply slit or cut away to form a plurality of upstanding legs 3. The end portions of such legs are alternately oppositely bent to form terminal flanges 4 which may, for example, be disposed at an angle of about 45° to each other (see Fig. 2). Oblong openings 5 are punched in such terminal flanges for a purpose which will be explained below.

Figure 3:
Fig. 3 is an elevational view of one form of my novel reinforced sealing strip.

Referring now to Figs. 3 and 4 of the drawing, there is there illustrated a form of sealing strip employing the above-described reinforcing member in combination with a resiliently deformable tubular sealing member adapted to be extruded thereon as taught in such Cable et al. application Serial No. 64,742. Such resilient sealing element comprises a tubular portion 6 and a laterally offset rib portion 7 enclosing a large portion of legs 3 of the metal reinforcing strip 1. As above indicated, such resiliently deformable sealing portion will ordinarily be of rubber or any equivalent material such as neoprene or the like. The reinforcing member 1, while ordinarily of metal such as steel or copper, may in some cases be of synthetic plastic or resin such as Bakelite. Plastic-impregnated paper strips or strips of cloth fabric are suitable for this purpose.

The rubber or like material may be bonded to the metal reinforcing member if desired, but I have found that this is generally not necessary with my construction and in fact often may not be desirable. The legs 3 of the reinforcing member are locked to the rubber element both by rubber passing through openings 5 therein and also by the fact that the ends 4 of such legs are bent so that withdrawal is impossible. On the other hand, when the rubber is not actually bonded to the metal, a certain degree of slippage is possible between the opposed surfaces of the same facilitating the bending of the assembled sealing strip to desired contour in use.

While my new sealing strip may be attached to a door frame or the like in such manner that it will be laterally engaged by the opening closure, it is a primary object of my invention to provide a sealing strip of the type described which is adapted to receive impacts and to seal along a line generally in a plane with legs 3 of the reinforcing element. As shown in Fig. 4, for example, the inner periphery of the tubular portion 6 is not entirely circular but has a flattened side or land 8 adjacent the reinforcing element. The oppositely directed terminal flanges 4 of such element resiliently support such land, presenting flat sides thereto ward rather than narrow edges. This is in direct contrast to prior art constructions wherein the reinforcing element has presented a relatively sharp edge in the direction of thrust tending to develop shearing forces hastening break-down of the rubber element. Fig. 10 illustrates one manner of mounting the new sealing strip of my invention utilizing a clamping bracket member 9 adapted to be secured to a supporting frame 10 by means of a screw 11 and provided with an offset seat portion 12 to receive and support the rubber stem 7 of the sealing strip. Such clamping member is also provided with an inturned lip 13 engaging lateral groove 14 in such rubber stem to secure the same against withdrawal. It will, of course, be obvious that many other forms of attaching means may be employed and the protruding portion of metal strip 1 may, for example, be spot welded at intervals to a metal supporting frame. When engaged by a closure member 15 moving in the direction indicated by the arrow in Fig. 10, tubular portion 6 will be deformed as illustrated. The side walls of such tubular portion are, however, supported against break-down by the reinforcing land 8 and the angularly extending terminal flanges 4 of the metal reinforcing member.

For some purposes a solid rib 16 of generally circular cross-section as shown in Fig. 5 is to be preferred and the offset flanges 4 likewise resiliently support the same against the action of forces of the type encountered when mounted as shown in Fig. 10.

In the Fig. 6 embodiment, the metal reinforcing strip 1 is entirely embedded and enclosed within the rubber stem portion 17, this arrangement being desirable when no exposed metal is required for attaching to a support and when it is desired to protect the metal from the action of corrosive atmospheres, for example.

Fig. 7 illustrates another embodiment generally similar to that of Fig. 4 but in which the leg portions of the metal reinforcing strip are bent at right angles to provide a portion 18 adapted to be embedded in the rubber stem portion 19 and a laterally offset portion 20 extending therefrom for attachment to a suitable support.

Fig. 9 illustrates yet another form of sealing strip utilizing a reinforcing member of the type shown in Fig. 8 and comprising two divergent rubber flanges or ribs 21 and 22 separated by a narrow flat land 23. The angularly inclined terminal flanges 4 of the metal supporting element leg members 18 serve both to resiliently support such rubber ribs in the region of attachment of the latter to the rubber stem or body portion 24 and also to assist in securing the rubber and metal elements of the assembly together in a manner preventing separation of the same even when the composite strip is relatively sharply bent to conform to desired contour.

It will be seen from the foregoing that I have provided a novel form of sealing strip comprising a resiliently deformable molded or extruded portion and an embedded reinforcing strip ordinarily of metal which is adapted to be mounted on a supporting structure in a variety of ways and to resist both break-down of the resilient sealing portion and separation of the sealing and reinforcing elements in use.

As shown in Figs. 4 and 5, for example, it will be seen that successive interrupted edge portions of the embedded metal reinforcing strip 1 are angularly disposed or offset relative to the radially disposed body portion thereof to present flat faces generally toward the centers of the rubber sealing members. Shearing stresses which would otherwise occur in use are thus avoided and the bifurcated portion of the rubber sealing member is resiliently supported (Fig. 10), the sheet metal element preferably being somewhat resilient in character itself.

Other modes of applying the principle of the invention may be employed, change being made as regards the details described, provided the features stated in any of the following claims or the equivalent of such be employed.

I therefore particularly point out and distinctly claim as my invention:

1. An elongated sealing strip comprising a resiliently deformable tubular rubber sealing member having a generally radially disposed rubber rib portion extending along the exterior of the same, and a sheet metal reinforcing and attaching element embedded in said rib portion in a plane generally radial of said tubular member, said metal element having interrupted embedded edge portions oppositely angularly disposed relative to such generally radial body portion of said element and extending generally parallel to the corresponding wall portions of said tubular member to brace the same, such edge portions having openings therethrough with rubber of said sealing member therein but said metal element being unbonded to such rubber and said tubular rubber sealing member having a longitudinally extending internal generally flat land in the region of said reinforcing element.

2. An elongated sealing strip comprising a resiliently deformable member of generally circular transverse cross-section, and a generally flat and rigid radially disposed reinforcing and attaching element embedded therein in a radial plane, said element having embedded edge portions oppositely angularly disposed to such radially disposed portion to mechanically interlock with said member against withdrawal and to present flat faces extending adjacent and generally parallel to the corresponding outer surface of said member adapted resiliently to resist deformation of said member.

3. An elongated sealing strip including a resiliently deformable rubber member of generally circular transverse cross-section and having a generally radially disposed rubber rib portion extending along the exterior of the same, and a sheet metal reinforcing and attaching element embedded in said rib portion and lying in a plane generally radial of said member, embedded edge portions of said metal element being oppositely angularly disposed relative to such radially disposed body portion of said metal element to present flat faces generally toward the center of said rubber member, said edge portions being thus embedded in said circular rubber member adjacent said rib portion.

4. An elongated sealing strip including a resiliently deformable rubber tubular sealing member having a generally radially disposed rubber rib portion extending along the exterior of the same, and a sheet metal reinforcing and attaching element embedded in said rib portion and lying in a plane generally radial of such tubular member, embedded edge portions of said metal element adjacent such tubular member being oppositely angularly disposed in the wall of said tubular member relative to such radially disposed body portion of said element.

5. An elongated sealing strip including a resiliently deformable rubber tubular sealing member, and a flat metal reinforcing and attaching element embedded therein and disposed generally radially thereof, successive interrupted edge portions of said metal reinforcing and attaching element embedded in said rubber tubular member being oppositely angularly inclined relative to the radially disposed body of said element to present flat supporting faces generally toward the center of such tube.

6. An elongated sealing strip including a resiliently deformable rubber sealing member having a bifurcated cross-sectional portion, and a flat metal reinforcing element embedded therein, successive interrupted edge portions of said metal reinforcing element embedded in said rubber sealing member being oppositely angularly offset respectively to conform generally to the angles of such bifurcation.

7. In an elongated sealing strip having an elongated resiliently deformable tubular sealing member, said member having a longitudinally extending rib portion, and a thin flat reinforcing element embedded in said rib portion and lying in a plane generally radial of said tubular member; oppositely angularly inclined successive interrupted inner edge portions of said reinforcing element embedded in said member and lying in planes generally included within the tubular wall of the latter.

8. In an elongated sealing strip of resiliently deformable material having a unitary relatively rigid thin flat reinforcing element embedded therein extending longitudinally thereof and with one edge portion protruding therefrom; successive interrupted inner edge portions of said reinforcing element embedded in said material being oppositely angularly disposed and separated by slots continuing into such protruding portion of said element but terminating short of the outer edge thereof.

References Cited in the file of this patent

UNITED STATES PATENTS

| Number | Name | Date |
|---|---|---|
| 2,102,393 | Tea | Dec. 14, 1937 |
| 2,102,935 | Baily | Dec. 21, 1937 |
| 2,132,272 | Reid | Oct. 4, 1938 |
| 2,139,780 | Tea | Dec. 13, 1938 |
| 2,169,503 | Schlegel | Aug. 15, 1939 |
| 2,182,983 | Goldberg | Dec. 12, 1939 |
| 2,273,182 | Dodge | Feb. 17, 1942 |
| 2,344,575 | Warren | Mar. 21, 1944 |
| 2,603,528 | Higbie | July 15, 1952 |

FOREIGN PATENTS

| Number | Country | Date |
|---|---|---|
| 552,198 | Great Britain | Mar. 26, 1943 |